United States Patent Office 2,990,379
Patented June 27, 1961

2,990,379
FOAMED POLYMER OF ISOCYANATE MODIFIED LACTONE POLYESTERS AND METHOD OF PREPARING SAME
Donald M. Young, New York, N.Y., and Fritz Hostettler, Charleston, W. Va., assignors to Union Carbide Corporation, a corporation of New York
No Drawing. Filed Jan. 15, 1957, Ser. No. 634,176
8 Claims. (Cl. 260—2.5)

This invention relates to foamed polymers derived from isocyanate-modified lactone polyesters, and to a method of preparing same.

This application is a continuation-in-part of our earlier applications Serial Nos. 577,948 and 577,951, filed April 13, 1956, now U.S. Patents 2,933,477 and 2,933,478, respectively.

It has been proposed heretofore to prepare foamed polymers by forming a polyester of a diol and a dicarboxylic acid, e.g., ethylene glycol and adipic acid, lengthening the chain by reacting the terminal active hydrogens of the polyester with a diisocyanate and simultaneously or stepwise foaming and "curing" the isocyanate-modified polyester by internal development of carbon dioxide and cross linking of the modified polyesters.

Foams of this type have given promise of being superior to synthetic foams heretofore produced in developing better tensile strengths, resistance to swelling in oils or organic solvents and ozone, and in ability to carry higher compression for a given density of foam. They also have given promise of being more versatile in that foams can be made rigid or flexible and open-celled or close-celled, as desired. However, these advantages have not yet been fully realized. It is recognized, for example, that among the foamed polymers of the polyurethane type heretofore suggested, the rigid foams are extremely brittle and the flexibility of the flexible foams at low temperatures is inferior to that of latex foam and therefore leaves much to be desired.

The discovery has now been made that foamed polymers of widely varying and preselectable properties can readily be prepared by isocyanate modification of polyesters derived from lactones. As indicated in this description of the invention, the foams may be rigid or flexible, open-celled or closed-celled and the flexible foams may be resilient or flaccid. Furthermore, the flexible foams are characterized by excellent low temperature properties in retaining flexibility at temperatures as low as −35 to −50° C. and even lower.

The foamed products of the invention have the advantage of being prepared without the application of external heat and of having low density, good resistance to solvents and very little tendency to support combustion. Unlike polyurethane foamed products heretofore proposed, foams from lactone polyesters compare very favorably to latex foams in their flexibility at lower temperatures. Another advantage that is most desirable from a commercial point of view is that the difficulties heretofore experienced in removing water of condensation from the polyesters and of keeping water out of the reaction until the proper time is very much reduced in that the polyesters utilized are formed without formation of water of condensation.

The products of the invention are characterized by the presence of a highly developed network of cross-linked series that are substantially linear and made up of interconnected groups composed of carbon, hydrogen and oxygen. Each interconnected group in the series is an opened lactone residue having an oxy group at one end, a carbonyl group at the other end and an intermediate chain of at least five carbon atoms, as many as three of which may be substituted. The groups are linked together end to end, i.e., terminal carbonyl group of one to the terminal oxy group of the next, to form a series of interconnected groups essentially comprising unsubstituted or substituted polymethylene groups connected to one another by carboxy groups. Two or more series are linked to one another through a polyvalent organic residue of a polyol, polyamine, amino alcohol, polycarboxylic acid, hydroxy carboxylic acid or amino carboxylic acid and the other ends of said series are linked to isocyanate residues which in turn are linked by means of urea groups to other isocyanate residues and isocyanate-modified polyester residues.

In accordance with one preferred embodiment of the invention, foamed polyurethanes are prepared by forming lactone polyesters having reactive terminal groups and extending the polyester, building up the polymer network and developing the foam by reaction thereof with water and excess polyisocyanate. The network formation and building up of the foam can take place substantially simultaneously or in more or less distinct steps. From the point of view of most economical operation and directness of procedure as well as continuous operation, it is preferable to prepare the lactone polyester in a first stage and then to effect substantially simultaneous network and foam development by admixing the polyester, polyisocyanate and water in the presence of a catalyst or by premixing the lactone polyester and water with catalyst and then adding the polyisocyanate. It is also possible to form a prepolymer by polyester extension, and then to develop the network and foaming. The various stages may be extended to the point of becoming substantially distinct or accelerated to the degree of making the successive stages almost simultaneous, e.g., by admixing the lactone polyester with isocyanate and catalyst and shortly thereafter adding water.

The chemistry of the method, whether performed in substantially one step after the lactone polyester formation or in a series of stages, is essentially the same. To facilitate an understanding of the reactions involved, they will be described as carried out sequentially to form a lactone polyester, extend the polyester to a prepolymer, and then to effect network and foam formation.

The preparation of a polyester is carried out by reaction of a polyfunctional initiator with one or more lactones having at least six carbon atoms in the ring as more fully described in application Serial No. 577,950, filed April 13, 1956. Generally, the preparation of a linear polyester may be illustrated by the reaction of a lactone with a diol as summarized by the equation:

I.

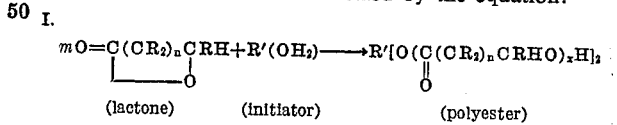

(lactone)      (initiator)           (polyester)

in which the R's stand for hydrogen, alkyl, cycloalkyl, alkoxy and single ring aromatic radicals; $n$ is at least four and at least $n+2$ R's are hydrogen; R' stands for a polyvalent aliphatic, cycloaliphatic, aromatic or heterocyclic radical; $m$ is at least two; and the sum of the $x$'s is equal to $m$.

As indicated in Equation I, the lactone is one containing at least six carbon atoms in the ring. Epsilon-caprolactone and substituted epsilon-caprolactones such as mono-, di- and tri-lower alkyl and alkoxy epsilon-caprolactones are preferred, the substituted lactones being readily available by conversion of various substituted cyclohexanones as described in copending application Serial No. 548,754, filed November 23, 1955, now abandoned. The cyclohexanones in turn may be obtained from substituted phenols or by other convenient synthetic routes. Lactones having more than six carbon atoms in the ring, e.g., zeta-enantholactone and etacaprylolactone, may also be employed in the preparation of the polyesters.

The difunctional initiator symbolized in Equation I by $R'(OH)_2$ is a diol capable, with or without the aid of a catalyst, of opening the lactone ring and adding lactones in the form of open chains. Suitable diols include alkylene glycols, alkylene ether glycols of the general formulae $$HO[(CH_2)_mO]_nH$$

and $$HO[CH(CH_3)CH_2O]_nH$$

where $m$ is from two to five and $n$ is one to about forty, as well as linear copolymers of ethylene and propylene oxides, or other 1,2-epoxides, various mono and disubstituted alkylene glycols, cyclohexanediols, alkylene-bis-cyclohexanols, xylenediols, hydroxyalkylphenalkyl alcohols and phenylene dialkanols, as well as heterocyclic diols such as 1,4-piperazine diethylene.

To initiate and continue the polymerization of the lactone, the lactone and the initiator are preferably heated to a temperature between about 50 and 200° C. in order to achieve a practical and desirable rate of reaction with a minimum of decomposition. The temperature may be considerably lower however, i.e., as low as about 20° C., at the sacrifice of speed of reaction and depending upon absence or presence of catalyst and, if present, the type of catalyst used. It may also be considerably higher, i.e., up to about 300° C., although care must be taken at such higher temperatures because of the more likely losses, at temperatures above 250° C., due to decomposition or undesirable side reactions. Generally, therefore, a temperature range of 20–300° C. is considered operable and a more limited range between about 50 and 200° C. is considered preferable.

The polymerization may be, and preferably is, accelerated by including minor amounts, ranging from as low as 0.001% to as high as about 0.5% by weight, of catalyst in the reaction mixture. A wide variety of catalysts may be employed for this purpose. These include particularly basic and neutral, as well as acidic, ester interchange catalysts.

The acidic catalysts, which are most active and therefore employed with temperatures in the lower portion of the range specified, include strong acids such as sulfuric, hydrochloric, phosphoric and perchloric acids as well as the Lewis acids such as the trifluoride, tribromide and trichloride of boron, the bromides and chlorides of aluminum, tin, and titanium and the chlorides of antimony, beryllium, bismuth, cadmium, gallium, iron, uranium, zinc and zirconium. The preferred acidic catalysts are sulfuric acid, perchloric acid, and the complexes of boron trifluoride with organic ethers.

The basic and neutral ester interchange catalysts that are suitable include the metals lithium, sodium, potassium, rubidium, caesium, magnesium, calcium, barium, strontium, zinc, aluminum, cobalt, titanium, germanium, tin, lead, antimony, arsenic, and cerium, as well as the alkoxides thereof, the carbonates of the alkali- and alkaline earth metals, organic tin oxides and titanates, titanium chelates and acylates, litharge, zinc oxide, antimony trioxide, germanium dioxide, cerium trioxide, cobaltous acetate, zinc borate and lead salts generally.

The duration of the polymerization varies from about a few minutes to about a week depending upon the lactone or mixtures of lactones selected, the initiator, the reaction temperature and the catalyst, if one is present. If it is desired to obtain a product of superior color, then it is preferable to conduct the reaction in the absence of oxygen. This may be accomplished, for example, by operating in a partial vacuum or in the presence of an inert gas such as nitrogen, which may be passed through the reaction mixture. After the polymerization is completed, any unreacted monomer may be removed by applying a vacuum thereto at elevated temperature, e.g., a vacuum of 1 to 5 mm. mercury at 120–160° C.

It is apparent from Equation I above that the preparation of the polyester has the unique advantage of permitting accurate control over the average molecular weight of the polyester, and further of promoting the formation of a substantially homogeneous polyester in which the molecular weights of the individual molecules are substantially all very close to the average molecular weight. This control, as is evident from Equation I, is obtained by preselecting the molar proportions of lactone and initiator in a manner that will readily be appreciated by those skilled in the art. Thus, for example, if it is desired to form a polyester in which the average molecular weight is approximately twenty times the molecular weight of the initial lactone or lactone mixture, then the proportions of lactone to initiator utilized in the polymerization are fixed at approximately 20:1 inasmuch as it is to be expected that on the average each molecule of initiator will add on an approximately equal number of lactones and an average of twenty lactone molecules would be available to each molecule of initiator.

A convenient method of measuring the molecular weight of a linear polyester is to determine the average number of carboxyl and hydroxyl groups in a given amount of the polyester. The acid number (milligrams of KOH per gram of polyester using phenolphthalein as an indicator) is a measure of the number of terminal carboxyl groups in a polyester. In the polyesters produced as described, the acid or carboxyl number is ordinarily and inherently very close to zero. The hydroxyl number, which is a measure of the number of terminal hydroxyl groups and is defined in terms of milligrams of KOH per gram of polyester, is determined by adding pyridine and acetic anhydride to the polyester and titrating the acetic acid formed with KOH as described in Ind. Eng. Chem., Anal. Ed., Vol. 16, pages 541–9 and in Ind. Eng. Chem., Anal. Ed., Vol. 17, page 394. The sum of the acid or carboxyl number and the hydroxyl number, referred to as the reactive number, is an indication of the average number of terminal groups present in the polyester and therefore is in turn an indication of the number of molecules in the mass and the degree of polymerization. A polyester containing long chain molecules will have a relatively low reactive number while a polyester containing short chain molecules will possess a relatively high reactive number. The molecular weight of the lactone polyester is calculated by use of the formula:

$$M.W. = \frac{\text{Functionality} \times 1000 \times 56.1}{\text{Hydroxyl number} + 2 \times \text{carboxyl number}}$$

It is to be understood that the term "polyesters," as used herein, is intended to include not only the homopolyesters prepared by initiating polymerization of one given lactone with an initiator but also copolyesters and blends of homo- and copolyesters involving the polymerization of two or more different lactones.

The extension of the linear lactone polyester prepared as illustrated and having terminal hydroxyl groups is accomplished by reaction with an appreciable molar excess, e.g., about 100–700%, of an aliphatic, cycloaliphatic or aromatic polyisocyanate. When the excess isocyanate and the lactone polyester each have two reactive terminal groups, the reaction involved is a so-called 2:2 type of polymerization illustrated by Equation II:

II.

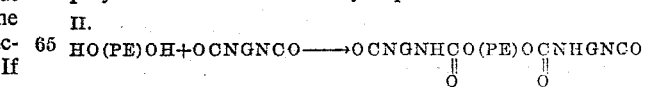

in which the symbol PE stands for the lactone polyester, exclusive of the terminal hydroxyl groups, and the symbol G stands for diisocyanates, exclusive of the reactive isocyanate groups, such as m- and p-phenylene diisocyanates; 2,4- and 2,6-tolylene diisocyanates; 2,3,5,6-tetramethyl-para-phenylene diisocyanate; o-, m-, and p-xylylene diisocyanates; 4,4'-biphenylene diisocyanate; 3,3'-dimethyl-4,4'-biphenylene diisocyanate; 3,3'-dimethoxy-4,4'-biphenylene diisocyanate; p,p'-bibenzyl diisocyanate; p,p'-diphenylmethane diisocyanate; 4,4'-methylene-bis-ortho-tolyl diisocyanate; 1,5-naphthalene diisocyanate; tetramethylene diisocyanate; hexamethylene diisocyanate; and various other diisocyanates such as those listed in the table of Siefken (Analen 562, pages 122-135) (1949).

The prepolymers thus prepared have the desirable attribute of being storable for appreciable lengths of time without deleterious effects if prepared in the absence of base catalysts and treated with a stabilizing or retarding agent.

When it is desired to form a foam, the mixture of prepolymer and excess unreacted diisocyanate is mixed with water, preferably in the presence of a catalyst. This involves several reactions that proceed simultaneously. One, illustrated schematically in Equation III, involves the reaction between the isocyanate groups and water to form urea groups and carbon dioxide.

III. ...GNCO+$H_2O$→...GNHCONHG...+$CO_2$

This reaction has the important effect of producing the carbon dioxide in situ for forming the voids of the final foamed product and also of linking the terminal isocyanate groups and thereby, where a 2:2 type polymerization preceded (Equation II), of linearly extending the prepolymer. Another of the reactions, illustrated in Equation IV, involves reaction of the urea groups formed in Reaction III with unreacted isocyanate groups to form biuret cross links:

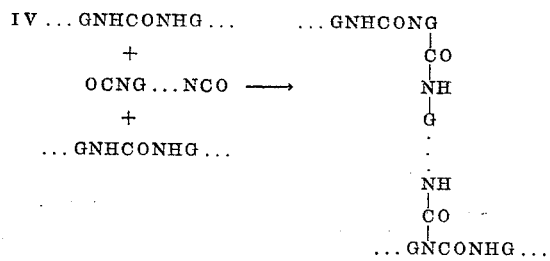

IV ...GNHCONHG...         ...GNHCONG
                                |
       +                        CO
                                |
   OCNG...NCO      ⟶            NH
                                |
       +                        G
                                |
   ...GNHCONHG...               .
                                NH
                                |
                                CO
                                |
                          ...GNCONHG...

In addition, the free isocyanates react with one another and with the isocyanates represented in Equation II to form chains of isocyanate residues connected to one another or to the isocyanate-modified polyester residues by urea groups. The formation of a good foam depends upon a simultaneous development of carbon dioxide and a cross linking of the molecules to trap the carbon dioxide and thus prevent collapse of the foam.

Depending upon the desired density of the foam and the amount of cross linking desired, the amount of water added in the third stage should be such that the ratio of equivalents of water to residual isocyanate equivalents, i.e., the isocyanate which is present as excess isocyanate over the reactive groups of the lactone polyesters, is most preferably kept within the range of about 0.8:1 to 1.2:1.

There are a considerable number of ways in which the method can be modified. One such modification is in the use, in whole or in part, of a difunctional initiator having one or more primary or secondary amino groups to prepare a linear lactone polyester.

Difunctional initiators other than the diols identified earlier include generally amino alcohols and diamines in which the amino groups are primary or secondary. Suitable amino alcohols include the aliphatic amino alcohols of the general formula $HO(CH_2)_nNH_2$ where $n$ equals two to ten, N-alkylalkanolamines, isoalkanolamines, aromatic amino alcohols such as aminophenalkyl and aminoalkaryl alcohols, and various cycloaliphatic amino alcohols such as amino cyclohexanols. Among the diamines that are useful for initiating polymerization of the lactones in the formation of lactone polyesters are aliphatic, monosecondary and disecondary amines containing from two to ten methylene groups; aromatic diamines including phenylene, naphthalene, xylylene and biphenylene diamines, benzidine and alkylene dianilines; cycloaliphatic diamines such as cyclohexane diamines and alkylene-bis-cyclohexylamines as well as heterocyclic diamines such as substituted and unsubstituted piperazines.

Another modification in the preparation of lactone polyesters is the employment of initiators having a higher functionality than two in order to prepare branched lactone polyesters, or mixtures thereof with linear lactone polyesters. Highly branched lactone polyesters have the advantage of making possible the cross linking of the polymer without interaction of urea or urethane groups. This has the very desirable result of making a larger proportion of the isocyanate used available for the evolution of carbon dioxide and of reducing the overall amount of isocyanate that is required in the preparation of the foamed polymer.

The higher functional initiators that are useful in preparing branched lactone polyesters include polyols, polyamines and amino alcohols having a total of three or more reactive hydrogen atoms on hydroxyl and primary or secondary amino groups. Suitable polyols include triols such as glycerol, trimethylolpropane, butane triols, hexane triols, trialkanolamines; various tetrols such as erythritol and pentaerythritol; pentols; hexols such as dipentaerythritol and sorbitol, as well as alkyl glucosides, carbohydrates, polyhydroxy fatty acid esters such as castor oil and polyoxy alkylated derivatives of polyfunctional compounds having three or more reactive hydrogen atoms such as, for example, the reaction product of trimethylolpropane, glycerol and other polyols with ethylene oxide, propylene oxide or other epoxides or copolymers thereof, e.g., copolymers of ethylene and propylene oxides. Higher functional amino alcohols and polyamines include, by way of example, diethanolamine, diisopropanolamine, 2-(2-amino-ethylamino)ethanol, 2-amino-2-(hydroxymethyl)-1,3-propanediol, diethylene triamine, triethylenetetramine, as well as various aryl polyamines such as 4,4',4''-methylidynetrianiline.

When a lactone polyester having three or more terminal hydroxyl groups is reacted with a diisocyanate, a highly branched prepolymer will result. Thus, for example, the reaction of a lactone polyester having three terminal hydroxyl groups with a diisocyanate may be represented by Equation V:

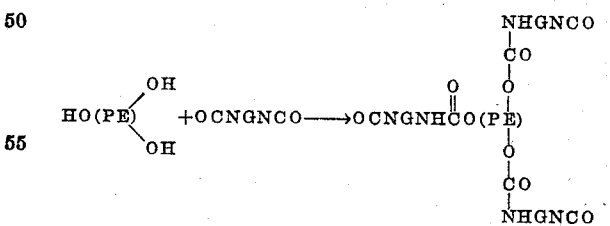

```
                                          NHGNCO
                                            |
         OH                           O     CO
        /                             ||    |
    HO(PE)   +OCNGNCO ⟶  OCNGNHCO(PE)
        \                                   |
         OH                                 CO
                                            |
                                          NHGNCO
```

It is also within the scope of the invention to add to linear or branched lactone polyesters, or mixtures thereof, small amounts of polyfunctional compounds such as glycerol, 1,2,4-butanetriol, 1,2,6-hexanetriol, trimethylolethane, trimethylolpropane, diethanolamine, triethanolamine and N,N,N',N'-tetrakis(2-hydroxyethyl)ethylenediamine before reacting the polyester with isocyanate. This modification has the advantage of increasing the number of cross linking sites and therefore of resulting in a rapid build-up of viscosity simultaneously with $CO_2$ development. While it requires a somewhat higher amount of isocyanate, it has the additional advantage of increasing the tear strength of the foams produced.

Branched isocyanate-modified lactone polyesters are also obtainable, in accordance with the invention, by reacting a lactone polyester having two terminal hydroxyl groups with an isocyanate having more than two reactive isocyanate groups as illustrated by Equation VI:

VI.

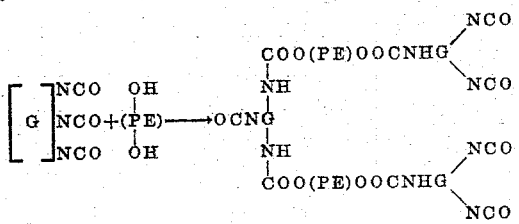

A number of suitable higher functional polyisocyanates are listed in the table of Siefken, referred to earlier. One of the more attractive types of polyisocyanate useful for this purpose is the product

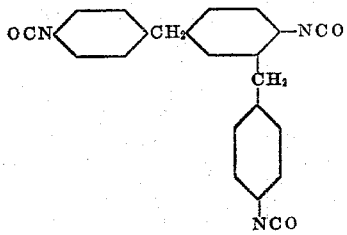

as well as the isomers thereof, obtainable by phosgenation of the reaction product of aniline and formaldehyde.

In reviewing the basic method of forming the foamed polymers and the various modifications described, it will become apparent that, after preparation of the lactone polyester, the process can be carried out continuously with substantially simultaneous polyester extension, cross-linking and foam formation, batchwise and in distinctly separate stages, or in any intermediate manner. The continuous method is the most direct and economical, requiring as equipment only a foaming machine. The other extreme, involving stepwise preparation of a prepolymer followed by foaming and network development, is desirable when the final processing is to be kept to a minimum, the prepolymer being formed in the absence of a catalyst at temperatures of the order of 80–120° C. Methods of intermediate speed and directness are also desirable, e.g., forming a prepolymer by reaction of a polyester with isocynate in the presence of a catalyst, followed shortly by addition of water.

Another modification contemplated is that of using a polycarboxylic acid instead of water as an agent for simultaneously producing carbon dioxide and cross linking. The basic reaction involved is illustrated in Equation VII:

VII.

$\ldots GNCO + R'(COOH)_y \rightarrow \ldots GNHCOR' \ldots + CO_2$

Still another variation in the method is that of forming foamed polymers from lactone polyesters having terminal carboxylic acid groups This method does not absolutely require the use of water as an agent for cross linking and producing the carbon dioxide necessary for foaming. In accordance with this embodiment of the invention, the polymerization of a lactone or mixture of lactones is initiated by a relatively small quantity of a polycarboxylic acid. The reaction is believed to take place as illustrated by Equation VIII:

VIII.

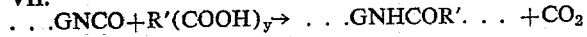

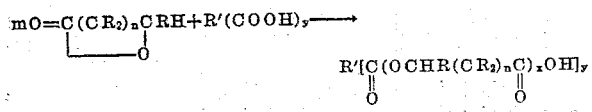

Among the polycarboxylic acids symbolized by $R'(COOH)_y$ in Equations VII and VIII that are suitable in these embodiments are such dicarboxylic acids as oxalic, succinic, maleic, glutaric, adipic, pimelic, suberic, azelaic, sebacic acids, various oxy acids such as 6,6'-oxydi-hexanoic acid, aromatic acids such as the phthalic acids, naphthoic acids, alkylene dibenzoic acids, biphenyl dicarboxylic acids and higher functional acids such as tricarballylic, aconitic and pyromellitic acids. When these carboxyl group-terminated lactone polyesters are reacted with polyisocyanates, the development of carbon dioxide and simultaneous chain lengthening takes place as illustrated in Equation IX:

IX.

$HOOC(PE)COOH + OCNGNCO$
$\rightarrow OCN[GNHCO(PE)CONH]_xGNCO + 2CO_2$ and cross linking will proceed between terminal isocyanate groups and the newly formed amide groups as illustrated in Equation X:

X.

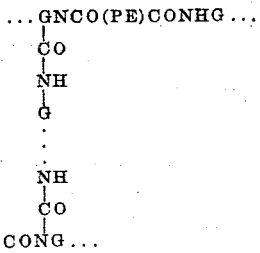

It will be understood that if the functionality of either or both the carboxylic acid group-terminated polyester and isocyanate is greater than two, additional cross linking will take place.

It has been found that while the reactions illustrated in Equations VII and IX develop carbon dioxide and are therefore operable for foaming, the amount of carbon dioxide developed is insufficient to give the ultimate foam a low enough density to be competitive with latex and polyvinyl chloride foams. For this reason, water is used in addition to the carboxylic acid in order to augment the carbon dioxide production and obtain a low density foam that is competitive with others on the market. It will be understood, of course, that the addition of water constitutes not only a source of additional carbon dioxide but also augments cross linking and chain extension reactions among the free isocyanates and the isocyanate polyesters as described earlier.

As a further variation of this embodiment of the invention, it is possible to use hydroxy and amino carboxylic acids as initiators for the polymerization of the lactone so that the lactone polyester will have one or more terminal carboxylic acid groups and one or more hydroxyl or amino groups, all capable of reaction with the isocyanate groups of an organic polyisocyanate. The preparation of foamed polymers from such lactone polyesters may be accomplished with or without the use of water as an agent for cross linking and for producing carbon dioxide, although the use of water is very much preferred and, for low density foams, is required.

It is apparent that there is considerable latitude in the method of the invention, not only with regard to whether the polyester extension, foaming and network development is carried out substantially simultaneously or sequentially, but also with regard to the choice of the particular lactone, initiator and isocyanate, as well as their relative proportions. The choice to be made among these variables is governed largely, aside from the availability of the various materials, by the type of foamed polymer ultimately desired. Generally speaking, unsubstituted lactones tend to form polyesters which are waxy solids at molecular weights over about 800-1000. Consequently, it is generally advisable, where unsubstituted lactones alone are used, to restrict the molecular weight of the polyesters made therefrom to less than about 1000 by appropriately controlling the molar proportion of unsubstituted lactone to initator. The use of unsubstituted lactones tends to impart rigidity and high tensile strength to the polyurethane foams ultimately prepared. Substituted lactones, on the other hand, form polyesters that are liquid even at high molecular weights of the order of 7000 and even 10,000. Therefore, substituted lactones can be reacted with relatively lower molar proportions of initiator to form relatively high molecular weight polyesters without making the polyesters hard to handle in the remainder of the process. Furthermore, foams made from polyesters that are in turn prepared from substituted lactones tend to be characterized by excellent flexibility, even at very low temperatures.

Lactone polyesters prepared by reacting lactones with an initiator having more than two reactive hydrogens or a combination of initiators, at least one of which has more than two reactive hydrogens, form branched polyesters that are most effective in trapping carbon dioxide as it is formed and therefore of producing a good foamed polymer. Generally speaking, to obtain a foamed polymer of given characteristics, the molecular weight of a branched lactone polyester used in its preparation should be somewhat higher than the molecular weight of a substantially linear polyester. The density of the foam ultimately produced is governed in large part by the availability of isocyanate groups to take part in carbon dioxide formation. Consequently, when low density of the foam is a primary requirement the use of considerable excesses in the upper portion of the 100-700% excess range are indicated, excesses of the order of 350-500% being preferred in order to obtain densities of approximately 2 lbs./cu. ft.

The molecular weights of the lactone polyester employed, and therefore the relative molar proportions of the lactones to the initiators, are preferably chosen with a view to the type of foamed polymer ultimately desired. Where the desideratum is a rigid foam, it is preferably to keep the proportions of lactone to initiator such that the molecular weight of the polyester will be in the range of about 500-1000, if the polyester is branched, or somewhat lower, e.g., about 300-700, if the polyester is substantially linear. Where maximum flexibility of the foamed polymer is a primary requirement, the polyester should, for optimum results, have a molecular weight of approximately 3000-7000, if it is branched, and somewhat less, about 1700-3000, if it is substantially linear and some of the lactones employed are substituted. For semi-rigid foams the molecular weight of branched polyesters should, for maximum effectiveness, be in the range of about 1000-3000, and of linear polyesters, in the range of about 1000-1500. Foam density can, as indicated earlier, be controlled at least in part by preselecting the molar excess of polyisocyanate made available for carbon dioxide formation.

With these guides, it is apparent that any one skilled in the art can readily prepare a foamed polymer that is "tailor-made" to its requirements.

One of the outstanding advantages derived from the use of lactones as starting materials is that the preparation of the polyesters is one that is inherently capable of being carried out under substantially anhydrous conditions whereas conventional methods of preparing polyesters, e.g., by condensation of dicarboxylic acids with a glycol, diamine or amino alcohol, results in a splitting off of water which requires considerable care to remove.

Another advantage is that the polyesters are stable and may be maintained in a substantially anhydrous condition with relatively little difficulty. Another important advantage is that highly branched polyesters can also be formed without encountering the difficulties of gelation that occur at fairly low molecular weights when attempts are made to synthesize branched polymer systems from polycarboxylic acids and polyols.

Catalysts that are suitable for accelerating the foaming and cross linking or curing reaction include inorganic and organic bases such as sodium hydroxide, sodium methylate, sodium acetate, sodium phenolate, tertiary amines and phosphines. Tertiary amines such as triethylamine, triisopropylamine, tributylamine, triamylamine, triethanolamine, the diethylethanolamine diester of adipic acid, N-methylmorpholine, N-ethylmorpholine, N,N'-dimethylpiperazine, N,N-dimethylhexahydroaniline, tribenzylamine and N,N-dimethylbenzylamine, are particularly suitable as catalysts. Catalyst concentrations between about 0.1 and about 3% by weight, based on the weight of the total ingredients, have been found adequate.

These catalysts are also suitable for use in the preparation of the prepolymer itself, particularly if the prepolymer is formed immediately before use to form a foam or if the foaming operation is made continuous. With the use of a catalyst the prepolymer can advantageously be formed at temperatures below 60° C.

If it is desired to store a prepolymer for any extended period of time before it is used in a foaming operation, it is preferable to prepare the prepolymr in the absence of a catalyst and at a somewhat higher temperature within the range of about 80-120° C. It is often also desirable, in this event, to add a retarder during or after the formation of the prepolymer. This not only slows down, as the name implies, the rate of reaction between terminal hydroxyl and isocyanate groups, but also inhibits reaction between the urethane groups formed during the prepolymer synthesis and the isocyanate groups. Among the retarders that are suitable for the polyester-isocyanate reaction are acids such as hydrochloric acid, sulfuric acid, phosphoric acid, boric acid, various organic acids, organic acid halides such as acetyl chloride and acetyl bromide, sulfonyl halides such as para-toluene sulfonyl chloride, inorganic acid halides such as phosphorous tribomide, phosphorous trichloride, phosphorous oxy chloride, sulfonyl chloride and thiamyl chloride, as well as sulfur dioxide and acidic sulfones.

In order to stabilize the composition during the foaming operation and to avoid breaking of the $CO_2$ bubbles in the early stages of the foaming, it is advantageous to employ a small percentage, e.g., about 0.001 to 10% by weight, based on the total ingredients, of a stabilizing or thickening agent such as ethoxylated cellulose, available on the market as "Ethocell", hydroxy ethylated cellulose, available as "Cellosize," benzyl cellulose, acetyl cellulose, acetylbutryl cellulose, hydroxy ethylated polyvinyl alcohol, polyvinyl chloride, vinyl chloride-vinyl acetate copolymers, polyvinyl acetate, polyvinyl butyral, polymeric methylmethacrylate, polymeric butylmethacrylate, high molecular weight polyethylene oxide, bentone, and metallic soaps of fatty acids such as aluminum stearate.

It is also within the scope of the invention to add fillers such as clays or diatomaceous earths in quantities up to 20% by weight, based on the weight of total ingredients. Dyes may also be added prior to the foaming step and are often desirable since polyurethane foams normally exhibit a slight tendency to yellow on aging.

Small quantities, of the order of 0.01 to 1% by weight, based on the weight of total ingredients, of silicone oils and paraffin oils are useful for regulation of the bubble size of the foam. As the amount of these additives increases, the foam bubbles become larger. In addition to the effect of polyester structure and choice of diisocyanate referred to earlier as influencing the physical cell structure, the use of certain surfactants as known in the art may also be relied upon to influence the type of foam that is formed.

The utility and advantages of the product and methods of the invention will become more apparent from the following examples included to illustrate the best modes now contemplated for carrying out the invention.

In each of Examples 1 to 9, the polyester, the diisocyanate, the catalyst and the emulsifier were mixed thoroughly at room temperature. The subsequent reaction was accompanied in each instance by an increase in viscosity and an increase in the temperature of the reactants to about 50° C. Within ten or fifteen minutes of the time the temperature of the prepolymer formed by the reaction began to drop off, the water was added and the mixture stirred violently. The mixture was then transferred to an open mold as soon as the foaming began, which was almost immediately. While the foam could be removed from the mold within an hour, approximately twenty-four hours were required to completely cure the cellular product.

In evaluating the physical properties of the foams produced in the various examples, density was determined by weighing a cylindrical sample two inches in diameter and one inch in thickness and thereupon calculating the density in pounds per cubic foot. To measure the tensile strength, a cylindrical sample one inch thick and one square inch in cross section was adhered to a metal plate at each end and extended in a Scott tensile tester, the load at rupture being recorded in terms of pounds per square inch (p.s.i.). To evaluate compression, a cylindrical sample two inches in diameter and one inch thick was placed on the anvil (six inch diameter) of an Instron equipped for compression tests, the cross head moved a plate of three inches in diameter toward the anvil at a rate of two inches per minute, and the stress load on the anvil was plotted against the deflection of the sample. The stress load is given in p.s.i. for 10 and 50% deflections. Low temperature tests were carried out on a Castle compression tester with cylindrical samples one square inch in cross section and one inch thick compressed between platens to 25% deflection, the stress load being recorded at various temperatures. The platens and the samples were housed in an insulated cabin in which the temperature was controlled to ±1° C., the temperature being varied from +20 to −50° C. and the load being recorded in p.s.i.

Example 1

Polyester:
- Mixed methyl-epsilon-caprolactones ----g-- 490
- Pentaerythritol ---------------------g-- 10.2
- Dibutyltin oxide --------------------g-- 0.25
- Reaction temperature, ° C. -------------- 170
- Reaction time, hrs. --------------------- 7
- Yield, percent ------------------------- 98.6
- Carboxyl number ----------------------- 0.8
- Hydroxyl number ----------------------- 33.1
- Calculated molecular weight ------------ 6460

Foam:
- Polyester ------------------------------g-- 75
- 2, 4-tolylylene diisocyanate containing 0.154% "Ethocell"[1] ---------------------g-- 26
- Emulsifier ----------------------------g-- 2
- N-methylmorpholine --------------------g-- 2
- Water ---------------------------------g-- 2.2
- Prepolymer reaction time, min. --------- 13

Physical properties of foam:
- Density, lbs./cu. ft -------------------- 2.50
- Tensile strength, p.s.i. ---------------- 20
- Load at 10% deflection, p.s.i. --------- 0.41
- Load at 50% deflection, p.s.i. --------- 0.99
- Load versus temperature at 25% deflection—

| Temp., °C.: | Load, p.s.i. |
|---|---|
| 20 | 1.0 |
| 0 | 1.0 |
| −10 | 1.0 |
| −20 | 1.2 |
| −30 | 1.8 |
| −40 | 4.8 |

[1] The "Ethocell" used was an ethoxylated cellulose having an average ethoxy content of 47.5–49%. A 5% solution of the product in eighty parts of toluene and twenty parts of absolute ethanol has a viscosity of 100 centipoises at 25° C.

Example 2

Polyester:
- Mixed methyl-epsilon-caprolactones --g-- 486.4
- Pentaerythritol -----------------------g-- 13.6
- Dibutyltin oxide ---------------------g-- 0.25
- Reaction temperature, ° C. ------------ 165–172
- Reaction time, hrs. -------------------- 6.75
- Yield, percent ------------------------- 98.4
- Carboxyl number ----------------------- 0.7
- Hydroxyl number ----------------------- 44.8
- Calculated molecular weight ----------- 4850

Foam:
- Polyester ------------------------------g-- 75
- 2,4-tolylene diisocyanate containing 0.75% poly-(ethylene oxide) (M.W. about one million) ---------------------------g-- 20
- Emulsifier ----------------------------g-- 2
- N-methylmorpholine --------------------g-- 2
- Water ---------------------------------g-- 2.2
- Prepolymer reaction time, min. --------- 16

Physical properties of foam:
- Density, lbs./cu. ft. ------------------ 2.44
- Tensile strength, p.s.i. --------------- 21
- Load at 10% deflection, p.s.i. -------- 0.27
- Load at 50% deflection, p.s.i. -------- 0.67
- Load versus temperature at 25% deflection—

| Temp., ° C.: | Load, p.s.i. |
|---|---|
| 20 | 0.6 |
| 0 | 0.8 |
| −10 | 0.9 |
| −20 | 1.3 |
| −30 | 2.7 |
| −40 | 8.1 |

Example 3

Polyester:
- Mixed methyl-epsilon-caprolactones -----g-- 490
- Pentaerythritol -----------------------g-- 10.2
- Dibutyltin oxide ---------------------g-- 0.25
- Reaction temperature, ° C. ------------- 170
- Reaction time, hrs. -------------------- 7
- Yield, percent ------------------------- 98.6
- Carboxyl number ----------------------- 0.6
- Hydroxyl number ----------------------- 33.1
- Calculated molecular weight ----------- 6550

Foam:
- Polyester ------------------------------g-- 75
- 2,4-tolylene diisocyanate -------------g-- 19
- Emulsifier ----------------------------g-- 2
- N-methylmorpholine --------------------g-- 2
- Water ---------------------------------g-- 1.5
- Prepolymer reaction time, min. --------- 15

Physical properties of foam:
- Density, lbs./cu. ft. ------------------ 4.57
- Tensile strength, p.s.i. --------------- 25
- Load at 10% deflection, p.s.i. -------- 0.75
- Load at 50% deflection, p.s.i. -------- 1.61
- Load versus temperature at 25% deflection—

| Temp., ° C.: | Load, p.s.i. |
|---|---|
| 20 | 1.2 |
| 0 | 1.3 |
| −10 | 1.4 |
| −20 | 1.8 |
| −30 | 3.0 |
| −40 | 9.5 |

Example 4

Polyester:
- Mixed methyl-epsilon-caprolactones _____ g__ 3982
- 1,2,6-hexanetriol _____ g__ 108
- Dibutyltin oxide _____ g__ 2.0
- Reaction temperature, °C. _____ 170
- Reaction time, hrs. _____ 6.75
- Yield, percent _____ 98.8
- Carboxyl number _____ 0.8
- Hydroxyl number _____ 34.4
- Calculated molecular weight _____ 4680

Foam:
- Polyester _____ g__ 75
- 2,4-tolylene diisocyanate containing 0.5% poly(ethylene oxide) (M.W. about one million) _____ g__ 26
- Emulsifier _____ g__ 2
- N-methylmorpholine _____ g__ 2
- Water _____ g__ 2.2

Physical properties of foam:
- Density, lbs./cu. ft. _____ 2.49
- Tensile strength, p.s.i. _____ 24
- Load at 10% deflection, p.s.i. _____ 0.32
- Load at 50% deflection, p.s.i. _____ 0.89

Example 5

Polyester:
- Mixed methyl-epsilon-caprolactones _____ g__ 407
- Castor oil (Baker U.S.P. grade) _____ g__ 93
- Dibutyltin oxide _____ g__ 0.25
- Reaction temperature, °C. _____ 170
- Reaction time, hrs. _____ 14
- Yield, percent _____ 98.0
- Carboxyl number _____ 1.4
- Hydroxyl number _____ 33.1
- Calculated molecular weight _____ 4700

Foam:
- Polyester _____ g__ 75
- 2,4-tolylene diisocyanate _____ g__ 26
- Emulsifier _____ g__ 2
- N,N-dimethylbenzylamine _____ g__ 2
- Water _____ g__ 2.7
- Prepolymer reaction time, min. _____ 10

After prepolymer formation was finished, 0.5 g. of water was added and agitation was continued until carbon dioxide formation had stopped (five minutes). This pre-reaction was done in order to increase the viscosity of the polyester system. After this pre-reaction, 2.2 g. of water were added and foaming allowed to take place in the usual manner.

Physical properties of foam:
- Density, lbs./cu. ft. _____ 3.39
- Tensile strength, p.s.i. _____ 34
- Load at 10% deflection, p.s.i. _____ 0.48
- Load at 50% deflection, p.s.i. _____ 0.96
- Load versus temperature at 25% deflection—

| Temp., °C.: | Load, p.s.i. |
|---|---|
| 20 | 0.8 |
| 0 | 0.9 |
| −10 | 1.1 |
| −20 | 1.2 |
| −30 | 1.75 |
| −40 | 3.2 |

Example 6

Polyester:
- Epsilon-caprolactone _____ g__ 137
- Mixed methyl-epsilon-caprolactones _____ g__ 128
- Mixed trimethyl-epsilon-caprolactones __ g__ 125
- Castor oil _____ g__ 93.3
- Hydrochloric acid (37%) _____ g__ 0.65
- Reaction temperature, °C. _____ 171–200
- Reaction time, hrs. _____ 12
- Yield, percent _____ 86.2
- Distillate, chiefly mixed trimethylepsilon-caprolactones _____ g__ 63
- Carboxyl number _____ 7.9
- Hydroxyl number _____ 40.3
- Calculated molecular weight _____ 3000

Foam:
- Polyester _____ g__ 75
- 2,4-tolylene diisocyanate _____ g__ 27
- Emulsifier _____ g__ 2
- N-methylmorpholine _____ g__ 2
- Water _____ g__ 2.2
- Prepolymer reaction time, min. _____ 13

Physical properties of foam:
- Density, lbs./cu.ft. _____ 3.30
- Tensile strength, p.s.i. _____ 22
- Load at 10% deflection, p.s.i. _____ 0.33
- Load at 50% deflection, p.s.i. _____ 0.84
- Load versus temperature at 25% deflection—

| Temp., °C.: | Load, p.s.i. |
|---|---|
| 20 | 0.6 |
| 0 | 0.8 |
| −10 | 0.9 |
| −20 | 1.0 |
| −30 | 1.1 |
| −40 | 2.25 |

Example 7

Polyester:
- Mixed methyl-epsilon-caprolactones ___ g__ 182
- Mixed dimethyl-epsilon-caprolactones _ g__ 114
- Castor oil _____ g__ 93.3
- Dibutyltin oxide _____ g__ 0.25
- Reaction temperature, °C. _____ 171–185
- Reaction time, hrs. _____ 5.33
- Yield, percent _____ 99.5
- Carboxyl number _____ 0.3
- Hydroxyl number _____ 43.6
- Calculated molecular weight _____ 3800

Foam:
- Polyester _____ g__ 75
- 2,4-tolylene diisocyanate _____ g__ 27
- Emulsifier _____ g__ 2
- N-methylmorpholine _____ g__ 2
- Water _____ g__ 2.2
- Prepolymer reaction time, min. _____ 13

Physical properties of foam:
- Density, lbs./cu.ft. _____ 3.86
- Tensile strength, p.s.i. _____ 28
- Load at 10% deflection, p.s.i. _____ 1.2
- Load at 50% deflection, p.s.i. _____ 2.53
- Load versus temperature at 10% deflection—

| Temp., °C.: | Load, p.s.i. |
|---|---|
| 20 | 1.1 |
| 0 | 1.2 |
| −10 | 1.3 |
| −20 | 1.9 |
| −30 | 3.3 |
| −40 | 8.1 |

Example 8

Polyester:
- Epsilon-caprolactone _____ g__ 228
- Mixed methyl-epsilon-caprolactones ___ g__ 256
- Castor oil _____ g__ 93.3
- Catalyst _____ None
- Reaction temperature, °C. _____ 192–230
- Reaction time, hrs. _____ 11
- Yield, percent (approximately) _____ 99
- Carboxyl number _____ 6.8
- Hydroxyl number _____ 28.4
- Calculated molecular weight _____ 4000

Foam:
- Polyester _____ g-- 75
- 2,4-tolylene diisocyanate _____ g-- 25
- Emulsifier _____ g-- 2
- N-methylmorpholine _____ g-- 2
- Water _____ g-- 2.2
- Prepolymer reaction time, min. _____ 11

Physical properties of foam:
- Density, lbs./cu.ft. _____ 2.19
- Tensile strength, p.s.i. _____ 20
- Load at 10% deflection, p.s.i. _____ 0.92
- Load at 50% deflection, p.s.i. _____ 1.78
- Load versus temperature at 25% deflection—

| Temp., °C.: | Load, p.s.i. |
|---|---|
| 20 | 1.1 |
| 0 | 1.2 |
| −10 | 1.4 |
| −20 | 1.4 |
| −30 | 1.75 |
| −40 | 2.6 |

*Example 9*

2692 grams (23.6 mols) of unsubstituted caprolactone were reacted with 682 grams (5.1 mols) of 1,2,6-hexanetriol in the presence of 0.32 gram potassium carbonate as catalyst while heated under an atmosphere of nitrogen at 170° C. for twenty-six hours. The resulting homopolyester was a yellow, viscous liquid having a hydroxyl number of 195, a carboxyl number of 1.6 and a molecular weight of about 830.

150 grams (about 0.18 mol) of the homopolyester thus prepared were mixed, at room temperature, with 65 grams (0.373 mol, about 200% molar excess) of 2,4-tolylene diisocyanate. The mixture was allowed to react for twenty minutes during which time the temperature increased to about 50–60° C. To the reaction mixture there were then added, while agitating vigorously, 3.5 grams of water, 1.5 grams of technical lauryl sodium sulfate and 0.5 gram N-methylmorpholine. The foaming was completed in about fifteen minutes while the temperature rose to 80° C. The foam was allowed to cure for twenty-four hours at room temperature and the cure was then completed by heating to 160° C. for fifteen minutes.

The foam thus prepared was rigid and had a density of 6.6 lbs./cu. ft.

In the following additional examples, the embodiment of the method employed was that of directly reacting the lactone polyester, water and isocyanate in the presence of an emulsifier and a catalyst. In each of these additional examples the lactone polyester was first mixed thoroughly with the emulsifier, the catalyst and the water. The diisocyanate was then added under violent agitation and as soon as the foaming reaction began the mixture was transferred into an open mold and allowed to expand. The foams thus prepared were removable from the mold after one hour but a twenty-four hour period at room temperature was required for complete curing of the foam.

*Example 10*

Polyester:
- Mixed methyl-epsilon-caprolactones _____ g-- 3500
- Ethylene glycol _____ g-- 103
- Dibutyltin oxide _____ g-- 1.75
- Reaction temperature, ° C. _____ 170
- Reaction time, hrs. _____ 24
- Yield, percent _____ 99.3
- Carboxyl number _____ 0.65
- Hydroxyl number _____ 50.3

Foam:
- Polyester _____ g-- 75
- Mixture of 2,4- and 2,6-tolylene diisocyanate containing 1% "Ethocell" (80% 2,4-, 20% 2,6-isomers) _____ g-- 23
- Emulsifier _____ g-- 2
- N,N-dimethylbenzylamine _____ g-- 2
- Water _____ g-- 1.5

The foam was prepared by the direct method.

Physical properties of the foam:
- Density, lbs./cu. ft. _____ 3.59
- Tensile strength, p.s.i. _____ 18
- Load at 10% deflection, p.s.i. _____ 0.54
- Load at 50% deflection, p.s.i. _____ 1.05
- Load versus temperature at 25% deflection—

| Temp., ° C.: | Load, p.s.i. |
|---|---|
| 20 | 1.1 |
| 0 | 1.3 |
| −10 | 1.5 |
| −20 | 2.0 |
| −30 | 3.6 |
| −40 | 11.8 |

*Example 11*

Polyester:
- Mixed methyl-epsilon-caprolactones _____ g-- 3500
- Ethylene glycol _____ g-- 103
- Dibutyltin oxide _____ g-- 1.75
- Reaction temperature, ° C. _____ 170
- Reaction time, hrs. _____ 24
- Yield, percent _____ 99.3
- Carboxyl number _____ 0.65
- Hydroxyl number _____ 50.3

Foam:
- Polyester _____ g-- 75
- Mixture of 2,4- and 2,6-tolylene diisocyanates containing 0.33% "Ethocell" (80% 2,4-, 20% 2,6-isomers) _____ g-- 36
- Emulsifier _____ g-- 2
- N-methylmorpholine _____ g-- 2
- Water _____ g-- 2.7

The foaming procedure employed was the direct method.

Physical properties of the foam:
- Density, lbs./cu. ft. _____ 2.0
- Tensile strength, p.s.i. _____ 11
- Load at 10% deflection, p.s.i. _____ 0.32
- Load at 50% deflection, p.s.i. _____ 0.96
- Load versus temperature at 25% deflection—

| Temp., ° C.: | Load, p.s.i. |
|---|---|
| 20 | 1.2 |
| 0 | 1.6 |
| −10 | 1.7 |
| −20 | 2.3 |
| −30 | 3.6 |
| −40 | 7.4 |

*Example 12*

1732 grams (39.4 mols) ethylene oxide were fed over a period of 14.25 hours to a charge of 268 grams (2 mols) trimethylolpropane admixed with 2.0 cc. boron trifluoride ethyl etherate (47% $BF_3$), the reaction mix being maintained at between 65 and 73° C. Stripping of the resulting polyether to 60° C. at 2 mm. Hg yielded 43 grams of a volatile material which was essentially dioxane. The polyether triol was obtained in a yield of 97.9% and had a hydroxyl number of 164.8 and a refractive index, measured at 30° C., of 1.4599.

A mixture of 81 grams of the triol thus obtained with 419 grams (3.27 mols) of a mixture of monomethyl-epsilon-caprolactones was heated to 170° C. for five hours in the presence of 0.25 gram dibutyltin oxide as catalyst, the reaction being considered complete when the refractive index at 30° C. had levelled off at 1.4669. The resulting branched polyester was stripped to 170° C. at 2 mm. Hg. No volatile material was driven off. The polyester was obtained in a 100% yield. It had a hydroxyl number of 29.2, a carboxyl number of 0.66, and a calculated molecular weight of 5500.

75 grams of the lactone-ethylene oxide polyester thus prepared were mixed with 2.2 grams water, 2.0 grams emulsifier and 0.55 gram N-methylmorpholine. 26 grams of 2,4-toluene diisocyanate containing 0.152% "Ethocell" were then added with intensive agitation. As soon as the foaming reaction began, the mixture was transferred into an open mold and allowed to expand. The reaction was complete in twenty minutes, the maximum temperature being 43° C.

The foam thus obtained had the following physical properties:

| | |
|---|---|
| Density, lbs./cu. ft. | 2.84 |
| Tensile strength, p.s.i. | 15 |
| Compression load at 50% deflection | 0.51 |
| Sack factor (ratio of compression loads at 50% and 10% deflection) | 2.13 |

Hardening temperature data:

| Temp., °C.— | Load, p.s.i. at 25% deflection |
|---|---|
| 20 | 1.25 |
| 0 | 1.5 |
| −10 | 1.6 |
| −20 | 2.1 |
| −30 | 2.7 |
| −40 | 4.6 |

Example 13

5590 grams (127 mols) ethylene oxide were fed over a period of 39.88 hours to a charge of 134 grams (one mol) trimethylolpropane admixed with 25 grams potassium hydroxide, the reaction mix being maintained at 130° C. for 27.75 hours and thereafter at 145° C. 17.1 grams phosphoric acid (85%) were added to give a 20% aqueous solution a pH of 6.8 to 7. Stripping of the resulting polyether to 180° C. at 4 mm. Hg yielded no volatile material. The polyether triol was obtained in a 100% yield and had a hydroxyl number of 32.8 and a refractive index, at 30° C., of 1.4663.

A mixture of 572.2 grams of the triol thus obtained with 177.8 grams (1.39 mols) of a mixture of monomethyl-epsilon-caprolactones was heated to 170° C. for 8.25 hours in the presence of 0.375 gram dibutyltin oxide as catalyst, the reaction being considered complete when the refractive index at 30° C. had levelled off at 1.4682. The resulting branched polyester was stripped to 180° C. at 2 mm. Hg to remove nine grams of volatile material and was obtained in a 98.8% yield. It had a hydroxyl number of 32.3, a carboxyl number of 3.4, and a calculated molecular weight of 4300.

75 grams of the lactone-ethylene oxide polyester thus prepared were mixed with 2.2 grams water, 2.0 grams emulsifier and 2.0 grams N-methylmorpholine. 25 grams of an 85/15% mixture of 2,4- and 2,6-toluene diisocyanate containing .05% "Ethocell" hydroxy cellulose were then added with intensive agitation. As soon as the foaming reaction began, the mixture was transferred into an open mold and allowed to expand. The reaction was complete in fifteen minutes, the maximum temperature being 57° C.

The foam thus obtained had the following physical properties:

| | |
|---|---|
| Density, lbs./cu. ft. | 3.72 |
| Tensile strength, p.s.i. | 19 |
| Compression load at 50% deflection | 0.97 |
| Sack factor (ratio of compression loads at 50% and 10% deflection) | 2.67 |

Hardening temperature data:

| Temp., °C.— | Load, p.s.i. at 25% deflection |
|---|---|
| 20 | 1.1 |
| 0 | 1.2 |
| −10 | 1.3 |
| −20 | 1.4 |
| −30 | 1.7 |
| −40 | 3.0 |

Example 14

2014 grams (34.6 mols) propylene oxide were fed over a period of 20.13 hours to a charge of 134 grams (one mol) trimethylolpropane admixed with 3.9 grams potassium hydroxide, 2.1 gram increments of KOH being added after 6.75 and fourteen hours of reaction and the reaction mix being maintained at between 130 and 145° C. Stripping of the resulting polyether to 180° C. at 1.5 mm. Hg yielded no volatile material. The polyether triol was obtained in a 100% yield, was water-insoluble, and had a hydroxyl number of 99.3 and a refractive index, at 30° C., of 1.4533.

A mixture of 210 grams of the triol thus obtained with 290 grams (3.71 mols) of a mixture of monomethylepsilon-caprolactones was heated to 170° C. for 6.75 hours in the presence of 0.25 gram dibutyltin oxide as catalyst, the reaction being considered complete when the refractive index, at 30° C., had levelled off at 1.4600. The resulting branched polyester was stripped to 180° C. at 2 mm. Hg. No volatile material was removed. The polyester was obtained in a 100% yield. It had a hydroxyl number of 42.9, a carboxyl number of 0.78, and a calculated molecular weight of 3780.

75 grams of the lactone-propylene oxide polyester thus prepared were mixed with 2.2 grams water, 2.0 grams emulsifier and 2.0 grams N-methylmorpholine. 26 grams of an 85/15% mixture of 2,4- and 2,6-toluene diisocyanate containing 0.5% "Ethocell" hydroxy cellulose were then added with intensive agitation. As soon as the foaming reaction began, the mixture was transferred into an open mold and allowed to expand. The reaction was complete in fifteen minutes, the maximum temperature being 47° C.

The foam thus obtained had the following physical properties:

| | |
|---|---|
| Density, lbs./cu.ft. | 3.68 |
| Tensile strength, p.s.i. | 36 |
| Compression load at 50% deflection | 2.13 |
| Sack factor (ratio of compression loads at 50% and 10% deflection) | 1.72 |

Hardening temperature data:

| Temp., °C.— | Load, p.s.i. at 25% deflection |
|---|---|
| 20 | 1.75 |
| 0 | 2.1 |
| −10 | 2.3 |
| −20 | 2.7 |
| −30 | 3.7 |
| −40 | 8.4 |

Example 15

3865 grams (66.6 mols) propylene oxide were fed over a period of 39.67 hours to a charge of 134 grams (one mol) trimethylolpropane admixed with 2.7 grams sodium hydroxide, 2.7 gram increments of KOH being added after 6.33, 12 and 34.67 hours of reaction and the reaction mix being maintained at between 140 and 145° C. Stripping of the resulting polyether to 180° C. at 2 mm. Hg yielded no volatile material. The polyether triol was obtained in a 100% yield, was water-insoluble, and had a hydroxyl number of 66.2 and a refractive index, at 30° C., of 1.4513.

A mixture of 400 grams of the triol thus obtained with 100 grams (0.78 mol) of a mixture of monomethyl-epsilon-caprolactones was heated to 170–172° C. for 1.42 hours in the presence of 0.25 gram dibutyltin oxide as catalyst, the reaction being considered complete when the refractive index at 30° C. had levelled off at 1.4530. The resulting branched polyester was stripped to 180° C. at 2 mm. Hg. No volatile material was removed. The polyester was obtained in a 100% yield. It had a hydroxyl number of 52.3, a carboxyl number of 0.63, and a calculated molecular weight of 3140.

75 grams of the lactone-propylene oxide polyester thus prepared were mixed with 2.2 grams water, 2.0 grams emulsifier and 2.0 grams N-methylmorpholine. 26 grams of an 85/15% mixture of 2,4- and 2,6-toluene diisocyanate containing 0.5% "Ethocell" hydroxy cellulose were then added with intensive agitation. As soon as the foaming reaction began, the mixture was transferred into an open mold and allowed to expand. The reaction was complete in twenty minutes, the maximum temperature being 49° C.

The foam thus obtained had the following physical properties:

Density, lbs./cu.ft. _____ 3.92
Tensile strength, p.s.i. _____ 26
Compression load at 50% deflection _____ 2.45
Sack factor (ratio of compression loads at 50% and 10% deflection) _____ 1.32

Hardening temperature data:

| Temp., °C.— | Load, p.s.i. at 25% deflection |
|---|---|
| 20 | 2.5 |
| 0 | 2.8 |
| −10 | 3.1 |
| −20 | 3.7 |
| −30 | 4.8 |
| −40 | 8.3 |

*Example 16*

197 grams (4.5 mols) ethylene oxide were fed over a period of 6.42 hours to a charge of 93 grams (0.08725 mol) castor oil admixed with 0.25 gram boron trifluoride ethyl etherate (47% BF$_3$), the reaction mix being maintained at between 70 and 102° C. The resulting polyether triol was stripped to 62° C. at 15 mm. Hg and was obtained in a yield of 72.1%. It had a refractive index, at 30° C., of 1.4615.

A mixture of 235 grams of the triol thus obtained with 384 grams (3 mols) of a mixture of monomethyl-epsilon-caprolactones was heated to 160–187° C. for 3.9 hours in the presence of one gram dibutyltin oxide as catalyst, the reaction being considered complete when the refractive index at 30° C. had levelled off at 1.4678. The resulting branched polyester was stripped to 187° C. at 3 mm. Hg to remove 16 grams of volatile material (largely methyl-epsilon-caprolactones) and was obtained in a 97.4% yield. It had a hydroxyl number of 33.0, a carboxyl number of 2.36, and a calculated molecular weight of 4450.

75 grams of the lactone-ethylene oxide polyester thus prepared were mixed with 2.2 grams water, 2.0 grams emulsifier and 2.0 grams N-methylmorpholine. 26 grams of 2,4-toluene diisocyanate were then added with intensive agitation. As soon as the foaming reaction began, the mixture was transferred into an open mold and allowed to expand. The reaction was complete in twenty minutes, the maximum temperature being 44° C.

The foam thus obtained had the following physical properties:

Density, lbs./cu. ft. _____ 2.56
Tensile strength, p.s.i. _____ 15
Compression load at 50% deflection _____ 0.51
Sack factor (ratio of compression loads at 50% and 10% deflection) _____ 2.13

Hardening temperature data:

| Temp., °C.— | Load, p.s.i. at 25% deflection |
|---|---|
| 20 | 0.7 |
| 0 | 0.8 |
| −10 | 0.9 |
| −20 | 1.0 |
| −30 | 1.2 |
| −40 | 2.0 |

*Example 17*

500 grams (0.5 mol) of Carbowax 1000, 600 grams (4.67 mols) of a mixture of monomethyl-epsilon-caprolactones, and 0.6 grams of dibutyltin oxide were heated at 170° C. for 18 hours in an atmosphere of nitrogen. The resulting polyester-ether was a waxy solid having a hydroxyl number of 48.4 and a carboxyl number of 0.9.

100 grams of the polyester-ether thus prepared were melted and mixed with 3.0 grams of water and 2.0 grams of N-methylmorpholine. 40 grams of a mixture of 65% 2,4- and 35% 2,6-tolylene diisocyanate containing 0.5% Ethocell were then added with intensive agitation. As soon as the foaming reaction began, the mixture was transferred into an open mold and allowed to expand.

The foam thus obtained had the following physical properties:

Density, lbs./cu. ft. _____ 2.54
Tensile strength, p.s.i. _____ 12
Compression load at 50% deflection, p.s.i. _____ 1.31
Compression load at 10% deflection, p.s.i. _____ 0.73

Hardening temperature data:

| Temp., °C.— | Load, p.s.i. at 25% deflection |
|---|---|
| 20 | 1.4 |
| 0 | 1.5 |
| −10 | 1.7 |
| −20 | 2.0 |
| −30 | 2.5 |
| −40 | 4.7 |

*Example 18*

703 grams (15.98 mols) of ethylene oxide and 235 grams (4.05 mols) of propylene oxide were fed over a period of 13 hours to a charge of 62 grams (1 mol) ethylene glycol admixed with 1.18 grams of boron trifluoride ethyl etherate, the reaction mix being maintained at 50–60° C. The resulting polyether was a viscous liquid having a hydroxyl number of 126.

A mixture of 250 grams of the polyether thus obtained with 250 grams (1.94 mols) of a mixture of monomethyl-epsilon-caprolactones was heated to 160° C. for 22 hours in the presence of 1.5 grams of dioctyltin oxide as catalyst. The resulting polyester-ether was a viscous liquid having a hydroxyl number of 65.1 and a carboxyl number of 1.25.

100 grams of the polyester-ether thus prepared were mixed with 3.1 grams of water and 2.0 grams of N-methylmorpholine. 43 grams of a mixture of 65% 2,4- and 35% 2,6-tolylene diisocyanate containing 0.5% Ethocell were then added with intensive agitation. As soon as the foaming reaction began, the mixture was transferred into an open mold and allowed to expand.

The foam thus obtained had the following physical properties:

Density, lbs./cu. ft. _____ 1.90
Tensile strength, p.s.i. _____ 8
Compression load at 50% deflection, p.s.i. _____ 0.57
Compression load at 10% deflection, p.s.i. _____ 0.27

Hardening temperature data:

| Temp., °C.— | Load, p.s.i. at 25% deflection |
|---|---|
| 20 | 1.0 |
| 0 | 1.0 |
| −10 | 1.1 |
| −20 | 1.3 |
| −30 | 1.8 |
| −40 | 3.2 |

It is to be expected that numerous modifications will readily become apparent to those skilled in the art upon reading this description. All such modifications are intended to be included within the scope of the invention as defined in the appended claims.

We claim:

1. A foamed polymer prepared by reacting (1) a polyester prepared by reacting (a) a lactone having from six to eight carbon atoms in the ring, and (b) a compound having at least two reactive hydrogens in radicals of the class consisting of hydroxyl, amino and carboxy groups with (2) a 100 to 700 molar excess of organic polyisocyanate, and (3) water.

2. A foamed polymer prepared by reacting (1) a polyester prepared by reacting (a) a lactone having from six to eight carbon atoms in the ring and (b) a compound having at least two reactive hydrogens in radicals of the class consisting of hydroxyl, amino and carboxy groups with (2) a 100 to 700% molar excess of organic polyisocyanate, and thereupon (3) admixing water with the reaction product for developing a foam and extensive cross linking.

3. A foamed polymer prepared by reacting (1) a polyester prepared by reacting (a) a lactone having from six to eight carbon atoms in the ring and (b) a compound having at least two reactive hydrogens in radicals of the class consisting of hydroxyl, amino and carboxy groups, adding thereto a small amount of an aliphatic polyhydric alcohol for increasing the number of cross linking sites in the polyester, and then reacting said polyester with (2) a 100 to 700% molar excess of organic polyisocyanate and (3) water.

4. A foamed polymer prepared by reacting (1) a polyester prepared by reacting (a) a mixture of epsilon caprolactones and (b) an aliphatic polyhydric alcohol, and then reacting said polyester with (2) a 100 to 700% molar excess of organic diisocyanate and (3) water.

5. Method for preparing a foamed polymer which comprises reacting (1) a polyester prepared by reacting (a) a lactone having from six to eight carbon atoms in the ring and (b) a compound having at least two reactive hydrogens in radicals of the class consisting of hydroxyl, amino and carboxy groups with (2) a 100 to 700% molar excess of organic polyisocyanate and (3) water.

6. Method for preparing a foamed polymer which comprises reacting (1) a polyester prepared by reacting (a) a lactone having from six to eight carbon atoms in the ring and (b) a compound having at least two reactive hydrogens in radicals of the class consisting of hydroxyl, amino and carboxy groups with (2) a 100 to 700% molar excess of organic polyisocyanate and thereupon (3) admixing water with the reaction product for developing a foam and extensive cross linking.

7. Method for preparing a foamed polymer which comprises reacting (1) a polyester prepared by reacting (a) a lactone having from six to eight carbon atoms in the ring and (b) a compound having at least two reactive hydrogens in radicals of the class consisting of hydroxyl, amino and carboxyl groups, adding thereto a small amount of an aliphatic polyhydric alcohol for increasing the number of cross linking sites in the polyester, and then reacting said polyester with (2) a 100 to 700% molar excess of organic polyisocyanate and (3) water.

8. Method for preparing a foamed polymer which comprises reacting (1) a polyester prepared by reacting (a) a lactone having six to eight carbon atoms in the ring and (b) an aliphatic polyhydric alcohol, and then reacting said polyester with (2) a 100 to 700% molar excess or organic diisocyanate and (3) water.

References Cited in the file of this patent

UNITED STATES PATENTS

| 2,650,212 | Windemuth | Aug. 25, 1953 |

FOREIGN PATENTS

| 745,312 | Germany | Mar. 31, 1944 |
| 861,609 | Germany | Jan. 5, 1953 |
| 869,867 | Germany | Mar. 9, 1953 |

OTHER REFERENCES

A.C.S. Abs. of Papers, 130th Meeting, 1956, September 1956, pages 16P and 17P.

Dombrow: "Polyurethanes," Reinhold Plastics Applications Series, pages 97 to 99, copyright 1957.